United States Patent [19]

Payne

[11] Patent Number: 4,552,804

[45] Date of Patent: Nov. 12, 1985

[54] PREVENTION OF SILICA MIGRATION IN THERMAL INSULATION WITH WATER-SOLUBLE SALTS OF INORGANIC OXYGEN-CONTAINING ACIDS OR ACIDIC GASES

[75] Inventor: Charles C. Payne, Aurora, Ill.

[73] Assignee: Nalco Chemical Company, Oak Brook, Ill.

[21] Appl. No.: 390,725

[22] Filed: Jun. 21, 1982

[51] Int. Cl.$^4$ ............................................. B05D 3/00
[52] U.S. Cl. ..................................... 428/283; 106/74; 427/397.7; 428/281; 428/288; 428/289
[58] Field of Search ............... 428/283, 281, 288, 289; 106/74; 427/294, 397.7

[56] References Cited

U.S. PATENT DOCUMENTS 4,041,199  8/1977  Cartwright ..................... 428/283

*Primary Examiner*—Marion E. McCamish
*Attorney, Agent, or Firm*—John G. Premo; Robert A. Miller

[57] ABSTRACT

In a process of manufacturing discrete, ceramic fiber insulation products, the steps of:

(a) providing an alkali-stabilized water suspension of colloidal silica;

(b) incorporating a water-soluble salt of an inorganic oxygen-containing acid in said suspension to form a modified suspension;

(c) and either infusing said modified suspension into a pre-treated mat of alumino silicate fibers or infusing the alkali stabilized water suspension of colloidal silica into the pre-treated mat and then subjecting the thus-treated mat to an acidic gas; and then, (d) drying said mats.

5 Claims, No Drawings

PREVENTION OF SILICA MIGRATION IN THERMAL INSULATION WITH WATER-SOLUBLE SALTS OF INORGANIC OXYGEN-CONTAINING ACIDS OR ACIDIC GASES

INTRODUCTION

Refractory products taking such configurations as board and various special shapes have been manufactured from alumino-silicate ceramic fibers impregnated with colloidal silica for use as high-temperature furnace insulation and the like. According to conventional practice, ceramic fibers comprising silica and from about 45 to about 55% alumina are selected to have a mean diameter of about 2 to 3 microns with random lengths ranging from about 1½ to about 3 inches. The fibers are slurried with dilute colloidal silica and then vacuum-formed using a mesh mold in order to create a board or other shape. Colloidal silica solutions for use in this process comprise water suspensions and commonly contain from about 15 to about 30% hydrophilic silica particles having a mean diameter ranging between 4 and about 75 millimicrons.

During the vacuum-forming step, part of the colloidal silica sol is withdrawn from the ceramic fiber mat. The fibers are ordinarily slurried initially at a rate of 300 to 400 grams of the dilute silica sol per 100 grams of fiber. Semi-finished products from the vacuum-forming operation are dried in a forced-air oven from 4 to 24 hours at from about 105° to about 500° C.

A serious problem exists with respect to these colloidal silica-loaded, ceramic fiber mats in that the silica particles tend to migrate with the water vehicle during the drying step, leaving crust-like surface layers and a soft, comparatively unimpregnated center. Accordingly, optimum breaking strengths have not been obtained.

SUMMARY OF THE INVENTION

In a process of manufacturing discrete, ceramic fiber insulation products, the steps of: providing an alkali-stabilized water suspension of colloidal silica; incorporating a water-soluble salt of an inorganic oxygen-containing acid in said suspension; and infusing said modified suspension into a pre-treated mat of alumino silicate fibers. An alternate procedure is to treat the mat with an alkali-stabilized water suspension of the colloidal silica and, then, treat the thus-treated mat with an acidic gas. After treatment, the mats are then subjected to a conventional drying step. Both the water-soluble salt of an inorganic oxygen-containing acid and the acidic gas prevent migration of the silica sol during the drying step.

The invention also relates to the novel silica sols used to practice the above process. It further relates to discrete ceramic fiber insulation products treated with such sols.

The Starting Silica Sols

The starting silica sols are preferably alkaline stabilized silica sols which have a pH of at least 8.5 and are composed of discrete dense spherical particles of silica having a particle size of at least 5 nanometers. In a preferred embodiment of the invention, the silica sol has a particle size range between 5–30 nanometers. Such sols, from a commercial standpoint, should be relatively concentrated, e.g. contain at least 5% and, preferably, 20% or more by weight of silica ($SiO_2$).

Alkaline sols of this type are described in U.S. Pat. No. 3,901,992, the disclosure of which is incorporated herein by reference. Typical sols that may be used are set forth below in Table I.

TABLE I

| NALCOAG[1] | 1030 | 1035 | 1050 | 1060 | 1130 | 1140 |
|---|---|---|---|---|---|---|
| Percent colloidal silica, as $SiO_2$ | 30 | 35 | 50 | 50 | 30 | 40 |
| pH | 10.2 | 8.6 | 9.0 | 8.5 | 10 | 10 |
| Average particle size, millimicrons | 11–16 | 16–22 | 16–25 | 40–60 | 8 | 15 |
| Average surface area, $M^2$/gram | 190–270 | 135–190 | 120–176 | 50–75 | 375 | 200 |
| Specific gravity at 68° F. | 1.205 | 1.255 | 1.390 | 1.390 | 1.214 | 1.296 |
| Viscosity at 77° F. c.p.s. | 5* | 5 | 70* | 5–10 | 7 | 8 |
| $Na_2O$, percent | 0.40 | 0.10 | 0.30 | 0.10 | 0.65 | 0.40 |

*Less than
[1]Registered Trademark of Nalco Chemical Company

A preferred starting material is NALCOAG 1140 silica sol having the following characteristics:
Colloidal Silica (as $SiO_2$): 40%
pH: 9.7
Average Particle Size: 15 mu
Average Surface Area: 200 $E^2$/g
Specific Gravity (at 68° F.): 1.296
Viscosity: 16 cps

The Water-Soluble Salts of the Inorganic Oxygen-Containing Acids or Acidic Gases These water-soluble compounds may be selected from any number of well-known chemicals. Illustrative and preferred are sodium bisulfite, sodium bicarbonate, sulfur dioxide, and carbon dioxide. Other compounds include the water-soluble salts of sulfuric, sulfurous, phosphorus, and phosphoric acids. The gases include the well-known acidic gases, sulfur dioxide or carbon dioxide.

The amount of the water-soluble salt of the inorganic oxygen-containing acid or acidic gas may vary from between about 0.1 to about 3% by weight, with a preferred dosage being 0.5–1% by weight to prevent silica migration. This dosage is for an average silica concentration ($SiO_2$) in the sol of about 22%. The amount of acidic salt or gas can vary depending upon the particle diameter of the silica sol as well as its concentration.

Working Examples

In order to determine the effectiveness of various additive compositions in achieving saturation of a pre-treated mat of alumino-silicate fibers, a suspension of colloidal silica in water was first prepared. The finely divided silica sol particles were selected to have an average size of 15 nanometers, and the resultant water suspension was stabilized with sodium hydroxide to a pH of 9.7±0.01 and with a total solids content of 40%. This sol is NALCOAG 1140.

Mats of the alumino-silicate fibers described hereinabove were prepared to measure 5 cm.×5 cm.×1.3 cm. by vacuum-forming from a slurry containing 22% silica as the sol specified in the preceding paragraph. These test mats were dried at about 105° C. overnight in a forced air oven. The results were as follows:

TABLE II

| Silica Sol Used | $SiO_2$ Conc. | % Sodium* Bisulfite | % Sodium* Bicarbonate | Strength Needed to Penetrate Center of Insulation to Depth of 1 cm | Percent Strength Improvement |
|---|---|---|---|---|---|
| NALCOAG | | | | | |
| 1140 | 22% | 0 | 0 | 8 psi | — |
| 1140 | 22% | 0.5% | 0 | 10 psi | 25% |
| 1140 | 22% | 0 | 0.5% | 9 psi | 12.5% |

*weight percent of acidic salt used in NALCOAG 1140 at 22% $SiO_2$.

I claim:

1. In a process of manufacturing discrete, ceramic fiber insulation products, comprising the steps of:
   (a) slurring alumino silicate fibers with colloidal silica and vacuum drying said slurry to form a pretreated mat;
   (b) providing an alkali-stabilized water suspension of colloidal silica, which has a pH of at least 8.5, a particle size of at least 5 nanometers and a $SiO_2$ concentration of at least 5% by weight;
   (c) incorporating from about 0.1 to about 3% by weight of a water-soluble salt of an inorganic oxygen-containing acid in said suspension to form a modified suspension;
   (d) infusing the modified suspension into the pretreated mat and then,
   (e) drying said mat.

2. In the process according to claim 1 where the water-soluble salt of an inorganic oxygen-containing acid is from the group consisting of sodium bisulfite or sodium bicarbonate.

3. A colloidal silica composition comprising an alkaline aqueous colloidal silica sol having a pH of at least 8.5 and which contains between 0.1 up to 3% by weight of a water-soluble salt of an inorganic oxygen-containing acid.

4. The colloidal silica composition of claim 3 where the aqueous colloidal silica sol has a pH of about 9.7 and an average particle size of about 15 nanometers and an average surface area of about 200 m²/g.

5. A composition comprising a discrete ceramic fiber insulation product comprising a mat of alumino silicate fibers which has been reenforced with the composition of claim 3.

* * * * *